Nov. 3, 1942. J. D. McBURNEY ET AL Re. 22,215

SEMISTIFF COLLAR

Original Filed Feb. 5, 1935

John Dorman McBurney
Edgar H. Nollau INVENTORS

BY Frank C. Thilberg

ATTORNEY.

Reissued Nov. 3, 1942 Re. 22,215

UNITED STATES PATENT OFFICE 22,215

SEMISTIFF COLLAR

John Dorman McBurney, Newburgh, N. Y., and Edgar Hugo Nollau, Wilmington, Del., assignors to E. I. du Pont de Nemours & Company, Wilmington, Del., a corporation of Delaware Original No. 2,201,908, dated May 21, 1940, Serial No. 5,078, February 5, 1935. Application for reissue July 31, 1941, Serial No. 404,948

8 Claims. (Cl. 154—46)

Figure 1:
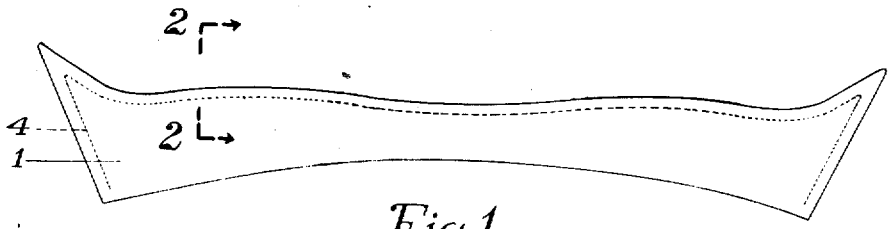

This invention relates to wearing apparel of the type adapted to be laundered, and more particularly to wearing apparel such as shirts, collars, cuffs, plaits, and the like, as forming part of such wearing apparel.

There are several types of fabric garments manufactured according to the present state of the art as, for example, those which are manufactured and worn in the untreated state, that is, the collars and cuffs have no stiffening agent; those having collars and cuffs and similar exposed portions stiffened with a temporary stiffening agent such as starch; those having collar and cuff units stiffened by partial parchmentization, by means of suitable reagents, and those in which starched interlinings are used as stiffeners. Further, certain cellulose derivative coated fabrics have been proposed as stiffening interlinings in collars and cuffs; and garments in which the component fabrics of the collars and cuffs are laminated by means of certain cellulose derivative compositions have also been made.

Of these various types mentioned, none are entirely satisfactory: those garments which are made of untreated fabrics soil quickly and wrinkle easily. The starched type, while presenting a very satisfactory initial appearance, is sensitive to spotting by water and soon becomes wilted and wrinkled especially in warm weather. The collars and cuffs of multi-ply construction, the fabrics of which are laminated and stiffened by partially parchmentizing the fabrics with acid, present the disadvantage of lowered tensile strength and consequent unsatisfactory wearing qualities. In the case of the wearing apparel having the pre-stiffened interlinings with starch, for example, the treatment is effective only until the first laundering which removes the starch. While the collar or cuff can, of course, be restiffened by treatment with starch, it does not retain its appearance for any length of time, particularly in summer weather. Where certain cellulose derivative coated fabric interlinings are used the result is not satisfactory because of the tendency for the coating to disintegrate and disappear and often to discolor when the garment comes in contact with some of the commoner reagents used in laundering. The same condition prevails with respect to collars and cuffs in which the component fabrics are laminated directly by means of the common cellulose derivative compositions.

This invention has as an object the provision of wearing apparel having semistiff collars, cuffs and the like which are non-wrinkling, readily cleanable by washing or dry cleaning, and capable of retaining their shape after laundering without being subjected to a subsequent stiffening operation.

A further object is the provision of a two-ply or multi-ply collar or cuff and the like which upon repeated launderings and pressings, will not show the characteristic "stitch pucker" of present day wearing apparel.

A still further object is the production of collars which will resist distorting influences and will tend to resume their original appearance when the distorting force is removed.

These objects are accomplished in the present invention by laminating a plurality of specially treated fabrics, of a design and weave suitable for the manufacture of the desired wearing apparel, and more particularly by previously coating fabric with an adhesive composition, drying to expel the volatile materials present in the adhesive composition where the adhesive contains such volatile material, placing two or more layers of fabric together with at least one adhesive film between adjacent layers or fabric, and joining by means of heat and pressure.

The general construction of the wearing apparel described in the present invention will be readily apparent by reference to the drawing.

Figure 2:
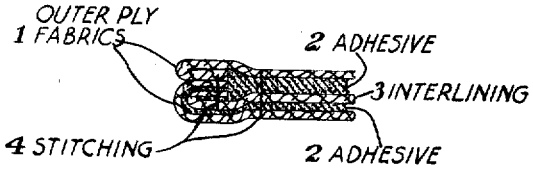
Figure 3:
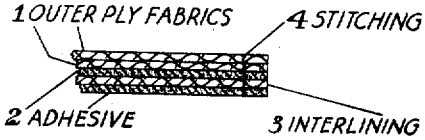
Figure 4:
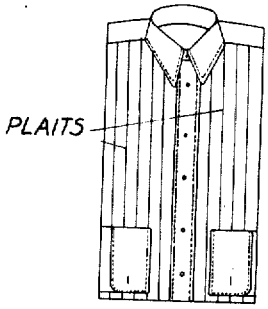
Figure 5:
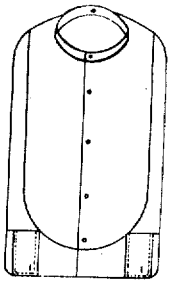

Figure 1 represents a diagrammatic sketch of a two-ply or multi-ply collar embodying the present invention, laid flat. Figure 2 represents a cross section along the line 2—2 in Figure 1 when Figure 1 is a three-ply collar. Figure 3 represents the assembly of the fabrics to which the thermoplastic adhesive has been applied before forming the collar. Figure 4 is a sketch of a finished shirt showing a collar, cuffs and plaits embodying the present invention. Figure 5 represents a dress shirt in which the front and cuffs have been rendered semistiff by the invention herein disclosed.

In Figures 1–3, 1 represents the outer ply fabrics of the finished collar; 2 indicates the thermoplastic adhesive; 3 indicates the interlining, and 4 represents stitching.

In order that the present invention may be more fully understood, the following definition of terms used is given.

By the term "thermoplastic" we mean the property by which certain materials have their adhesiveness increased sufficiently to enable them to firmly bond or unite fabrics or other materials to themselves, or to other materials, under the influence of heat and pressure, and by which they retain their bonding capacity after these influences have been removed. The adhesive should soften to the extent that it will engage the materials to be united sufficiently intimately to produce a firm bond therebetween when the materials coated with such an adhesive are placed in contact and subjected to heat and pressure. The adhesive should become quite soft at temperatures between 250° and 350° F., which correspond approximately to normal ironing temperatures. On the other hand, the adhesive must be sufficiently flow resistant, at the temperature of boiling water and at the operating temperature used, to prevent the migration of the adhesive to the opposite side of the material through the interstices thereof when the material to which it is applied is of a porous nature, such as cloth.

The firm bond formed by the adhesive must also be resistant to the cleaning materials used in normal laundering operations so that it does not become softened thereby, and the adhesive must not become discolored to such an extent that it changes the appearance of the apparel in which it is incorporated.

By the term "plasticizing agent" we mean one or more ingredients of an adhesive composition which impart thereto the property of enhancing its thermoplasticity as defined above. The "plasticizing agent" is a solvent plasticizer, such as dibutyl phthalate, tricresyl phosphate, dibutyl tartrate, or diethyl phthalate, either alone or replaced in whole or in part by a resin. In certain cases, for example where the resin exhibits very pronounced thermoplastic properties, the plasticizer may be completely replaced by such resin. If the resin is to replace a considerable proportion of the plasticizer it is essential that the resin have thermoplastic properties. Where the resin does not have thermoplastic properties the percentage of substitution must necessarily be low in order to prevent impairment of the thermoplastic properties of the adhesive.

By the term "plasticized cellulose derivative compositions" we mean those containing both a cellulose derivative and a plasticizing agent as defined above.

By a three-ply collar is understood a construction in which an extra layer of fabric, usually of a cheaper and coarser grade, is interposed between the outer plies of the collar, the function of this intermediate layer being to add stiffness, thickness, and general body to the article. This ply is indicated as interlining 3 of the drawing.

By the term "semi-stiff" collar is understood one having a pliability or "hand" intermediate an unstarched, untreated soft collar on the one hand, and a fully starched collar or an old-style Celluloid collar on the other hand.

In the practice of the present invention, the thermoplastic adhesive composition is applied to one side of a suitable fabric, such, for example, as a broadcloth weighing 3.40 ounces per square yard and having a thread count of 150 in the warp direction and 78 in the filler direction, by means of a doctor knife, squeeze rollers, spraying equipment, or by any of the methods known to those skilled in the art of coating fabrics. After application of the adhesive, the coated material is dried either in the air at room temperature, or by placing the coated stock in a chamber or oven where the volatile solvents are expelled by air which has been heated to 180° to 240° F. After the adhesive film is dried the fabric may be rolled up and stored until it is required for use.

In one form of the invention the plies, which ultimately form the collar, cuff or other portion of a garment, are next cut from the fabric in any convenient manner, as by means of suitable dies. The component pieces of the adhesive coated fabric thus obtained are then assembled by stitching, with the uncoated surfaces arranged face to face. The collar is then turned inside out to bring the two adhesive coated surfaces together inside the collar, and the joining of the parts is accomplished by applying heat and pressure simultaneously. Any means which will give a temperature of 250° to 350° F., and a pressure ranging from a few pounds per square inch to several thousand pounds per square inch, may be used to effect the firm bonding of the two fabrics. Where desired, a row of decorative stitching along the edges of the collar, except the edge to be attached to the neck band, may be put in before the collar is affixed to its neck band.

In a three-ply collar, as shown in Figures 2 and 3, the interlining, which is usually a cotton fabric of cheaper construction, as for example a sheeting weighing 4.7 ounces per square yard and having a thread count of 49 warp threads and 54 filling threads, is preferably coated on both faces with the thermoplastic adhesive composition by any suitable means, such as those disclosed above. The adhesive film is then dried, and the interlining is cut from this material by means of a die. The collar is then assembled by placing two die-cut outer plies together, laying the coated interlining on top of these, and stitching. The collar is then turned inside out so that the interlining will be between the two outer plies. The parts are then firmly bonded together as before, by means of heat and pressure. The ornamental stitching is then applied and the collar is ready for affixing to the neck band of a shirt where it is to be used in this way. Where desired, however, this ornamental stitching may be done before the plies are cemented together, and/or the collar may be used as a separable collar.

If it is desired to fabricate wearing apparel having more than three plies of fabric, similar procedures are used.

The following examples of thermoplastic adhesive compositions which have been successfully used in making collars in the practice of our invention are given by way of illustration but not by way of limitation:

*Example 1*

| | Per cent by weight |
|---|---|
| Cellulose nitrate | 16.0 |
| Tricresyl phosphate | 7.3 |
| Ethyl acetate | 28.0 |
| Ethyl alcohol | 42.1 |
| Barytes | 6.6 |

The cellulose nitrate in this example is preferably of the high viscosity type having a viscosity characteristic of 40 to 60 seconds.

The viscosity characteristic of the cellulose nitrate used is the number of seconds required, at 25° C., for a ¼ inch diameter steel sphere to fall 10 inches through a dispersion, containing 16 ounces of this cellulose nitrate in one gallon of a solvent mixture consisting of 40% by weight of ethyl acetate and 60% by weight of ethyl alcohol, in a cylinder having an internal diameter of 1½ inches. The nitrogen content of the cellulose nitrate used in this composition should lie preferably between 11.4 and 11.6%. It is understood, however, that other types of cellulose nitrate may be used, the present one being an example of the type which is found to be particularly satisfactory when broadcloth layers are bonded.

Collars formed by uniting an interliner, coated with the cement of Example 1 and dried, to layers of broadcloth, by means of heat and pressure, have been soiled and laundered commercially. It was found that after 24 launderings they showed no signs of deterioration of the cement and no objectionable color change.

The following examples of adhesive compositions within the scope of our invention have shown promising results when used to unite layers of cloth to form collars, etc., but the tests had not been completed to the point where failure occurred at the time of filing this application. From the preliminary results, however, it is believed they will be satisfactory for commercial use.

*Example 2*

| | Per cent by weight |
|---|---|
| Vinyloid resin | 35.0 |
| Diethyl phthalate | 13.0 |
| Pigment | 6.5 |
| Methyl ethyl ketone | 45.5 |

The resin of this example is obtainable by the interpolymerization of 80 parts by weight of vinyl chloride and 20 parts by weight of vinyl acetate without a stabilizer. It has been found that polymerized vinyl acetate is remarkably resistant to discoloration in laundering and that polymerized vinyl chloride maintains a firm bond in washing, and when interpolymerized in the above proportions the optimum results are obtained, in fact, white collars having plies joined by means of such an adhesive retain their whiteness and maintain the firm bond exceptionall well.

Other examples of adhesive compositions within the general scope of our invention, particularly when the qualifications for satisfactory durability are not as stringent as we have herein set forth, are as follows:

*Example 3*

| | Per cent by weight |
|---|---|
| Cellulose nitrate | 16.0 |
| Tricresyl phosphate | 8.0 |
| Pigment | 12.0 |
| Ethyl acetate | 22.0 |
| Ethyl alcohol | 42.0 |

*Example 4*

| | Per cent by weight |
|---|---|
| Cellulose nitrate | 18.7 |
| Vinylite resin | 15.3 |
| Tricresyl phosphate | 16.3 |
| Methyl ethyl ketone | 28.5 |
| Ethyl acetate | 10.8 |
| Ethyl alcohol | 10.4 |

The resin of this example is obtainable by the interpolymerization of 60 parts by weight of vinyl chloride and 40 parts by weight of vinyl acetate.

*Example 5*

| | Per cent by weight |
|---|---|
| Cellulose acetate | 8.0 |
| Toluene sulphonamide-formaldehyde condensation product | 8.0 |
| Tricrysel phosphate | 16.0 |
| Pigment | 24.0 |
| Acetone | 44.0 |

*Example 6*

| | Per cent by weight |
|---|---|
| Ethyl cellulose | 27.3 |
| Tricresyl phosphate | 4.6 |
| Ethyl acetate | 26.3 |
| Ethyl alcohol | 41.8 |

*Example 7*

| | Per cent by weight |
|---|---|
| Polyether resin | 37.5 |
| Tricresyl phosphate | 12.5 |
| Toluene | 50.0 |

By the polyether resin noted in this example we mean resins such as those prepared from dichloro ethyl ether and resorcinol, and other resins obtainable from polyhydric phenols and aliphatic polyhalides as disclosed in the copending application of J. A. Arvin, Serial No. 651,634, filed January 13, 1933, which has now matured into Patent No. 2,060,715, dated November 10, 1936.

*Example 8*

| | Per cent by weight |
|---|---|
| Methyl methacrylate* | 23.0 |
| Diethyl phthalate | 14.9 |
| Toluene | 51.6 |
| Ethyl alcohol | 10.5 |

Collars formed by uniting an interliner, coated with the cement of Example 8 and dried, to layers of broadcloth, by means of heat and pressure, have been soiled and laundered commercially. It was found that such collars did not show signs of deterioration of the cement until after 65 launderings, and that such collars did not show signs of objectionable color change until after between 30 and 40 launderings.

*Example 9*

| | Per cent by weight |
|---|---|
| Methyl methacrylate* | 21.0 |
| Diethyl phthalate | 18.9 |
| Toluene | 50.1 |
| Ethyl alcohol | 10.0 |

Collars formed by uniting an interliner, coated with the cement of Example 9 and dried, to layers of broadcloth, by means of heat and pressure, have been soiled and laundered commercially. It was found that such collars did not show signs of objectionable color change until they had been subjected to 32 launderings, and were still satisfactory with respect to nondeterioration of the cement at this point.

*Example 10*

| | Per cent by weight |
|---|---|
| Methyl methacrylate* | 21.0 |
| Diethyl phathalate | 18.9 |
| Pigment | 5.7 |
| Toluene | 45.2 |
| Ethyl alcohol | 9.1 |

*The resin of Examples 8, 9, and 10 may be prepared by heating a clear solution of 600 g. of methyl methacrylate monomer, 12 g. of benzoyl peroxide, and 2400 g. of toluene on a steam bath for 7 hours. The temperature rises to 96° C. in about one hour and gradually drops back to 86° C. at the end of 7 hours of heating. The clear slightly viscous solution which is formed is cooled and run dropwise with good stirring into 2400 g. of gasoline. The resulting fine white solid is removed and redispersed in 2400 g. of gasoline. The resin is dried at 100° C. The mass of resin can subsequently be ground to a white powder without difficulty. The methyl methacrylate monomer referred to above may be prepared in any suitable way; for example, as set forth in U. S. Patent No. 1,980,483 to Hill. A 15% toluene solution of the polymer has a viscosity of 0.03 poise. The yield is 560 g. which is 93.4% of the theoretical.

The thermoplastic adhesive compositions noted above are compounded by procedures well known in the art and modifications of such procedures will readily occur to those skilled in the art of preparing such compositions.

The practice of the present invention is not confined to collars and cuffs of collar-attached shirts, but is also capable of use where the collar and cuffs are prepared as separable units intended for attachment to the shirt by buttons or by similar devices. Further, while wearing articles of two or three-ply construction have been illustrated, this number may be increased to any desired number.

In the above examples we have disclosed cellulose nitrate, cellulose acetate, and ethyl cellulose, but we do not wish to be limited thereto, because thermoplastic cements containing other cellulose esters, such as cellulose butyrates or cellulose propionates, or other cellulose ethers, such as benzyl cellulose, may also be used in the manner taught herein. Where such other cellulose derivatives are used, it will be obvious that they may be combined with resins, plasticizers, pigments, fillers, and solvents in the general manner set forth above, as will be apparent to those skilled in the art.

The purpose of the volatile solvent in those compositions in which one is used is principally to act as a carrier for the solid constituents of the adhesive. The volatile material does not necessarily play a part in the adhesion of the fabrics since it may be entirely removed by drying, as previously described. The use of volatile solvents in certain instances permits the deposition of a smooth film of the thermoplastic material and also assists in the ease of applying the adhesive to certain types of fabrics.

A modification of the above procedure which has been found to be very effective in cases where two porous materials are joined, such as cloth, consists in applying a solvent to one or more of the dried adhesive surfaces immediately prior to joining these parts by applying heat and pressure.

It is impractical to set a fixed ratio of plasticizer to cellulose derivative since all plasticizers do not soften all cellulose derivatives to the same extent, as will be readily apparent to those skilled in the art. Furthermore, when a thermoplastic resin is used in conjunction with a cellulose derivative and plasticizer the percentage of the latter may be decreased.

It will be noted from the examples that where cellulose acetate or cellulose nitrate is used without a resin, the percentage of plasticizer is comparatively high. In general the ratio of plasticizer to cellulose derivative in these cases is at least about .4 part of plasticizer to one part of cellulose acetate or cellulose nitrate, and plasticizer may be present in amounts considerably greater than the amount of cellulose acetate or cellulose nitrate used. For practical purposes it may be said that the preferred ratio of plasticizer to cellulose acetate or cellulose nitrate is from about 4:1 to 3:1.

These ratios represent our preferred operating range when the cellulose ester is plasticized with a solvent plasticizer. We have previously stated that when we refer to "plasticized cellulose derivative compositions," we intend to include those in which part or all of the solvent plasticizer is replaced by a resin. When part or all of the plasticizing agent is a resin, a larger amount of the latter may be used than when the plasticizing agent is a solvent plasticizer. Since the plasticizing power and thermoplastic properties of resins differ widely, it is impractical to assign a numerical value to the maximum operative ratio, but in general it may be said that, where a resin replaces the solvent plasticizer in whole or in part, their combined percentage may sometimes be as much as several times the percentage of cellulose ester present in the adhesive composition.

Cellulose ethers on the other hand are much more thermoplastic than cellulose acetate or cellulose nitrate, and in formulae using cellulose ethers without a resin the ratio of plasticizer to cellulose ether should preferably be reduced to the order of 1:3 or 1:20 or even a smaller fraction of the cellulose ether present.

It is understood that various modifications with regard to solvents used will be readily apparent to those skilled in the art. For example, in place of ethyl acetate other esters as butyl propionate, isopropyl acetate, etc., may be used. In general, the choice of volatile solvents will be governed by the degree of solubility of the constituents of the adhesive, the rapidity of removal of the volatile material desired and also economic factors.

Other inorganic pigments, such as titanium dioxide, may be used; and further, mineral pigments which are either translucent or opaque, white or colored, may be introduced into the adhesives. The use of barytes is advantageous in certain instances because combinations of the type described yield a translucent film. If colored pigments are used they should not be of a type which is bleached by ordinary laundering agents.

No limitation is placed on the type of fabric which may be used in the construction of the wearing apparel which is described in the invention. Common types of cotton fabrics used for producing collars, cuffs, plaits of shirts, and the like wearing apparel, such as broadcloth, madras, oxford cloth, etc., may be used. Further, silk fabrics and various types of fabrics woven from synthetic yarns, such as are made from regenerated cellulose, cellulose acetate, cellulose nitrate, cuprammonium cellulose, etc., are included within the scope of the invention. Linen fabrics as well as other natural type yarn fabrics may also be used.

The product of the invention finds particular use as a component part of shirts of the negligee type where it is desirable to have a garment retain its crisp freshly laundered appearance even under conditions of very warm weather and high humidity, where the ordinary type of garments are found to wilt, wrinkle and become unsightly from the moisture of the atmosphere and perspiration of the wearer. As previously indicated, in addition to collars and cuffs on shirts and similar wearing apparel, the product of the invention finds itself applicable to the manufacture of plaits and demibosoms in the shirt industry, and it is also particularly adapted for collars, cuffs and other exposed portions of nurses', chauffeurs', and maids' uniforms and the like. The invention finds further application in the manufacture of neckties of various types, where several plies of suitable fabric are laminated to yield a non-wrinkling cravat.

While we have disclosed our invention with respect to collars, cuffs, and the like, we do not wish to confine it to the manufacture of these specific pieces of apparel. For example, we have also found that suits of linen, cotton, light-weight wool or other similar fabrics may have the lapels and collars of the coat and the cuffs of the trousers treated as above described. We may also cement the fabrics making up the lapel and collar of rain-coats, particularly of gabardine material. This prevents the lapel from puckering when sewed or when the garment becomes wet from rain. "Stitch pucker" is also eliminated in collars embodying our invention because the plies are firmly bonded throughout the adjacent surfaces, and even the stitching is thoroughly anchored and embedded in the adhesive.

The adhesives disclosed above are not affected by ordinary dry cleaning methods and apparel embodying our invention will have a neat and orderly appearance characteristic of new cloth when so cleaned and pressed.

When a fabric to be treated is of a very open or porous weave the viscosity of the adhesive should be correspondingly increased, so that when the treated fabric is subjected to heat and pressure the adhesive will not strike through and stick to the heating iron or rolls. The proper viscosity can easily be determined by trial with the selected fabric or will probably be evident to those skilled in the art.

For instance, as discussed above in connection with Example 1, a cellulose nitrate having a viscosity characteristic of from 40 to 60 seconds (determined as explained in detail there) is satisfactory when broadcloth layers are being bonded. Where the material has a very open or porous weave, or is extremely thin, the viscosity characteristic of the cellulose nitrate used should be much higher, and sometimes cellulose nitrate having a viscosity characteristic as high as 1,000 seconds can be used, if diluted. On the other hand, where the fabric is very closely woven, or is quite thick, cellulose nitrate of much lower viscosity characteristic than 40 to 60 seconds may be used satisfactorily. In extreme cases this viscosity characteristic may be as low as ½ second (when determined as indicated above).

If the viscosity characteristic is lowered too much, the film will lack body and will not withstand as many launderings, whereas if it is increased too high, a considerably higher temperature, pressure, and time of dwell is necessary in joining the parts; therefore, the viscosity is limited only by practicability.

Collars, cuffs, and other stiffened portions of wearing apparel prepared according to the preferred form of our invention have been found to withstand normal laundering much better than the garment to which they are attached. For example, it is generally considered that a man's negligee shirt of good quality may be laundered at least 20 times before objectionable fraying or failure of the cloth itself occurs. As indicated in the examples collars prepared according to our invention have withstood a much greater number of launderings.

The subject matter involving the use of methyl methacrylate for preparing semistiff collars has been divided from this application and is claimed in U. S. Patent 2,083,199 issued June 8, 1937.

As many apparently widely different embodiments of this invention may be made without departing from the spirit and scope thereof, it is to be understood that we do not limit ourselves to the specific embodiments thereof except as defined in the appended claims.

We claim:

1. A semistiff collar comprising a plurality of textile fabric layers firmly bonded together by means of thermoplastic adhesive consisting, other than pigment, of a cellulose derivative and a plasticizing agent therefor, said plasticizing agent containing a thermoplastic synthetic resin compatible with the cellulose derivative and said plasticizing agent being present exclusive of the resin in amount between .4 and 3 parts to each part of cellulose derivative, the amount of the resin in the plasticizing agent being substantially equal in amount to the cellulose derivative, said adhesive being soft at temperatures between 250° F. and 350° F. and sufficiently flow resistant at temperatures of boiling water to prevent migration of the adhesive through the fabric layers, said collar being capable of withstanding repeated launderings and pressings.

2. The article of claim 1 in which the thermoplastic resin is a vinyl resin.

3. The article of claim 1 in which the resin is a toluene sulfonamide-formaldehyde condensation product.

4. A semistiff collar comprising a plurality of textile fabric layers firmly bonded together by means of a thermoplastic adhesive consisting essentially of a cellulose derivative and a plasticizing agent therefor selected from the group consisting of solvent plasticizers, thermoplastic synthetic resin plasticizers compatible with the cellulose derivative, and mixtures of solvent plasticizers and said resin plasticizers, said plasticizing agent being present in amount between 0.4 and 3 parts to each part of cellulose derivative, said adhesive being soft and adhesive between temperatures of about 250° F. and 350° F. and sufficiently flow resistant at temperatures of boiling water to prevent migration of the adhesive through the fabric layers, said collar being capable of withstanding repeated launderings and pressings.

5. A collar interliner adapted to bond a face-ply and a back-ply firmly together to form a semi-stiff collar that is capable of withstanding repeated launderings and pressings, which comprises a layer of fabric having a film of thermoplastic adhesive on at least one side consisting essentially of a cellulose derivative and a plasticizing agent therefor selected from the group consisting of solvent plasticizers, thermoplastic synthetic resin plasticizers compatible with the cellulose derivative, and mixtures of solvent plasticizers and said resin plasticizers, said plasticizing agent being present in amount between 0.4 and 3 parts to each part of cellulose derivative, said adhesive being soft and adhesive between temperatures of about 250° F. and 350° F. and sufficiently flow resistant at temperatures of boiling water to prevent migration of the adhesive through the said face- or back-ply when the interliner is joined thereto.

6. The product of claim 5 in which the cellulose derivative is an ester.

7. The product of claim 5 in which the cellulose derivative is an ether.

8. The product of claim 5 in which the cellulose derivative is cellulose acetate.

JOHN DORMAN McBURNEY.
EDGAR HUGO NOLLAU.

CERTIFICATE OF CORRECTION.

Reissue No. 22,215. November 3, 1942.

JOHN DORMAN McBURNEY, ET AL.

It is hereby certified that error appears in the printed specification of the above numbered patent requiring correction as follows: Page 3, first column, line 39, for "exceptionall" read --exceptionally--; page 4, first column, line 71, for "4:1" read --.4:1--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.